(12) United States Patent
Balinski et al.

(10) Patent No.: US 11,455,693 B2
(45) Date of Patent: *Sep. 27, 2022

(54) VISUAL FOCAL POINT COMPOSITION FOR MEDIA CAPTURE BASED ON A TARGET RECIPIENT AUDIENCE

(71) Applicant: International Business Machines Corporation, Armonk, NY (US)

(72) Inventors: Peter A. Balinski, Elmhurst, NY (US); Sasikanth Eda, Andhra pradesh (IN); John G. Musial, Newburgh, NY (US); Sandeep R. Patil, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 803 days.

This patent is subject to a terminal disclaimer.

(21) Appl. No.: 15/669,152

(22) Filed: Aug. 4, 2017

(65) Prior Publication Data

US 2017/0337639 A1 Nov. 23, 2017

Related U.S. Application Data

(63) Continuation of application No. 14/156,691, filed on Jan. 16, 2014, now Pat. No. 9,760,954.

(51) Int. Cl.
*G06Q 50/00* (2012.01)
*G06Q 10/10* (2012.01)
(Continued)

(52) U.S. Cl.
CPC .............. *G06Q 50/01* (2013.01); *G03B 7/28* (2013.01); *G03B 15/02* (2013.01);
(Continued)

(58) Field of Classification Search
CPC ........ G06Q 50/01; G06Q 10/02; G06Q 10/10; G06F 16/9535; G03B 7/28; G03B 15/02;
(Continued)

(56) References Cited

U.S. PATENT DOCUMENTS 7,646,972 B2 1/2010 Dunko et al.
8,077,252 B2 12/2011 Fukugawa et al.
(Continued)

FOREIGN PATENT DOCUMENTS

EP 0987584 A1 3/2000
EP 2430612 A1 3/2012

OTHER PUBLICATIONS

Mostly-tech.com. How to Upload Photos Directly from Your Camera to Facebook or Instagram, mostly-tech.com. Jan. 5, 2013. [Retrieved on: Apr. 2, 2020], Retrieved from internet: <URL:https://mostly-tech.com/2012/12/26/how-to-upload-photos-directly-from-your-camera-to-facebook-or-instagram/>. (Year: 2013).*

(Continued)

*Primary Examiner* — Lynda Jasmin
*Assistant Examiner* — Ehrin L Pratt
(74) *Attorney, Agent, or Firm* — Cantor Colburn LLP; Samuel Waldbaum (57) ABSTRACT

Visual focal point composition of media capture based on a target audience is provided. An aspect includes activating a profile selection function via a media recording device and receiving, via the profile selection function, an identifier of a target viewer of media content. The profile selection function provides a list of social network contacts, including the target viewer, via the media recording device. Another aspect includes retrieving contact preferences associated with the identifier. The contact preferences are determined from data about the target viewer that is sourced from one or more compartmentalized entities. The contact preferences (Continued)

identify focal aspects of media content statistically determined to be of interest by the target viewer. A further aspect includes providing suggested focal aspects of a scene subject to media capture. The suggested focal aspects are derived from the contact preferences.

6 Claims, 4 Drawing Sheets (51) Int. Cl.
G06F 16/9535 (2019.01)
H04N 5/232 (2006.01)
G03B 7/28 (2021.01)
G03B 15/02 (2021.01)
G06Q 10/02 (2012.01)
H04N 5/235 (2006.01)
H04N 5/77 (2006.01)
H04N 1/00 (2006.01)
H04N 1/32 (2006.01)
H04N 5/238 (2006.01)
H04N 9/82 (2006.01)

(52) U.S. Cl.
CPC ......... G06F 16/9535 (2019.01); G06Q 10/02 (2013.01); G06Q 10/10 (2013.01); H04N 5/2351 (2013.01); H04N 5/2353 (2013.01); H04N 5/23216 (2013.01); H04N 5/23222 (2013.01); H04N 5/232127 (2018.08); H04N 5/772 (2013.01); H04N 1/00251 (2013.01); H04N 1/32101 (2013.01); H04N 5/238 (2013.01); H04N 9/8205 (2013.01)

(58) Field of Classification Search
CPC ........... H04N 5/23212; H04N 5/23216; H04N 5/23222; H04N 5/2351; H04N 5/2353; H04N 5/772; H04N 5/238; H04N 9/8205
See application file for complete search history.

(56) References Cited

U.S. PATENT DOCUMENTS

| | | | |
|---|---|---|---|
| 8,248,482 B2 | 8/2012 | Oks et al. | |
| 9,014,509 B2* | 4/2015 | Fedorovskaya | G06Q 50/01 382/305 |
| 9,467,723 B2* | 10/2016 | Osminer | H04N 21/251 |
| 9,760,954 B2 | 9/2017 | Balinski et al. | |
| 2004/0012700 A1* | 1/2004 | Okisu | H04N 1/4072 348/333.01 |
| 2008/0134053 A1 | 6/2008 | Fischer | |
| 2008/0174678 A1* | 7/2008 | Solomon | H04N 5/217 348/231.99 |
| 2009/0085918 A1 | 4/2009 | Hollingworth et al. | |
| 2009/0180771 A1 | 7/2009 | Liu et al. | |
| 2011/0029622 A1 | 2/2011 | Walker et al. | |
| 2011/0098056 A1 | 4/2011 | Rhoads et al. | |
| 2011/0223970 A1 | 9/2011 | Mori et al. | |
| 2012/0169889 A1 | 7/2012 | Vitsnudel et al. | |
| 2012/0249819 A1 | 10/2012 | Imai et al. | |
| 2012/0257072 A1 | 10/2012 | Jirman et al. | |
| 2012/0266191 A1* | 10/2012 | Abrahamsson | G06Q 30/0224 725/35 |
| 2012/0275642 A1 | 11/2012 | Aller et al. | |
| 2013/0036134 A1 | 2/2013 | Neven | |
| 2013/0040660 A1* | 2/2013 | Fisher | G06Q 30/02 455/456.1 |
| 2013/0050507 A1 | 2/2013 | Syed et al. | |
| 2013/0120591 A1* | 5/2013 | Bednarczyk | H04N 1/00137 348/207.1 |
| 2013/0135510 A1 | 5/2013 | Lee et al. | |
| 2013/0169853 A1* | 7/2013 | Luong | H04N 5/23206 348/345 |
| 2013/0173368 A1* | 7/2013 | Boutin | G06Q 10/101 705/14.16 |
| 2014/0028885 A1* | 1/2014 | Ma | H04N 5/23216 348/333.01 |
| 2014/0032546 A1* | 1/2014 | Lee | H04N 1/32128 707/734 |
| 2014/0129331 A1* | 5/2014 | Spivack | G06Q 30/0269 705/14.53 |
| 2014/0156681 A1* | 6/2014 | Lee | G06F 16/9535 707/754 |
| 2015/0067048 A1* | 3/2015 | Kannan | H04L 65/40 709/204 |
| 2015/0281566 A1* | 10/2015 | Rav-Acha | H04N 5/23219 348/222.1 |
| 2017/0243244 A1* | 8/2017 | Trabelsi | G06Q 30/0255 |
| 2017/0286995 A1* | 10/2017 | Shenk | G06Q 30/0246 |

OTHER PUBLICATIONS

Lauren Margolis. Push-to-Post: An Automated Wireless Photography Workflow. blog.photoshelter.com. Jun. 21, 2013. [Retrieved on: Apr. 2, 2020], Retrieved from internet: <URL:https://blog.photoshelter.com/2013/06/push-to-post-an-automated-wireless-photography-workflow/>. entire document (Year: 2013).*

W. Yin, T. Mei, C. W. Chen and S. Li, "Socialized Mobile Photography: Learning to Photograph With Social Context via Mobile Devices," in IEEE Transactions on Multimedia [online], Jan. 2014 [retrieved on Apr. 7, 2022] Retrieved from the Internet: <URL: https://ieeexplore.ieee.org/document/6609129> (Year: 2014).*

Nguyen et al.; "Multilevel Metadata Exploration Using Meta-Previewer and Cascading-View Widgets", IEEE/RIVF International Conference on, Jul. 13-17, 2008, pp. 298-305.

Sarvas et al.; "Metadata Creation System for Mobile Images", ACM/MbiSYS'04, Proceedings of the 2nd International Conference on, Jun. 6-9, 2004, pp. 36-48.

Bullas, Jeff "48 Significant Social Media Facts, Figures and Statistics Plus 7 Infographics", retrieved at: https://www.jeffbullas.com/48-significant-social-media-facts-figures-and-statistics-plus-7-infographics/; dated Dec. 2, 2017; 19 pgs.

* cited by examiner

PROFILE OF CONTACT C –

GIVES MORE IMPORTANCE TO NATURE THAN PEOPLE

LIKES WHITE COLOR AS BACKGROUND

LIKES ANIMALS

FIG. 5

VISUAL FOCAL POINT COMPOSITION FOR MEDIA CAPTURE BASED ON A TARGET RECIPIENT AUDIENCE

DOMESTIC PRIORITY

This application is a continuation of and claims priority from U.S. patent application Ser. No. 14/156,691, filed on Jan. 16, 2014, entitled "VISUAL FOCAL POINT COMPOSITION FOR MEDIA CAPTURE BASED ON A TARGET RECIPIENT AUDIENCE," the content of which are incorporated herein by reference in its entirety.

BACKGROUND

The present disclosure relates generally to data processing, and more specifically, to visual focal point composition for media capture based on a target recipient audience.

Users of media recording devices, such as cameras and smartphones, are typically motivated to capture media content (e.g., images and video) that will be of interest to their network contacts. In addition, the availability of content response indicators, such as a "like" function, a "post comment" function, and a "share" function, on some social networks can further enhance a user's motivation to post the right type of content. Thus, the content likely to generate more attention from the user's contacts is more likely to be posted by the user. However, it may not always be clear to the user what types of content will be of interest to others. In fact, the appreciation of aspects of media content posted to a website can be quite diverse among individuals having differing tastes and preferences. For example, some people may appreciate nature and natural landscapes, while others may prefer cityscapes and architecture. Animal lovers may appreciate images of domestic or wild animals more than they do of people or things.

BRIEF SUMMARY

Embodiments include a method, media recording device, and computer program product for visual focal point composition of media capture based on a target recipient audience.

A method includes activating a profile selection function via a media recording device and receiving, via the profile selection function, an identifier of a target viewer of media content. The profile selection function provides a list of social network contacts, including the target viewer, via the media recording device. The method also includes retrieving contact preferences associated with the identifier. The contact preferences are determined from data about the target viewer that is sourced from one or more compartmentalized entities. The contact preferences identify focal aspects of media content statistically determined to be of interest by the target viewer. The method further includes providing suggested focal aspects of a scene subject to media capture. The suggested focal aspects are derived from the contact preferences.

A computer program product includes a computer readable storage medium having program code embodied therewith. The program code is executable by a computer to activate a profile selection function via the media recording device and receive, via the profile selection function, an identifier of a target viewer of media content. The profile selection function provides a list of social network contacts, including the target viewer, via the media recording device. The program code is further executable to retrieve contact preferences associated with the identifier. The contact preferences are determined from data about the target viewer that is sourced from one or more compartmentalized entities. The contact preferences identify focal aspects of media content statistically determined to be of interest by the target viewer. The program code is also executable to provide suggested focal aspects of a scene subject to media capture, the suggested focal aspects derived from the contact preferences.

A media recording device includes a media capture component, a memory having computer readable computer instructions and a processor for executing the computer readable instructions to perform a method. The method includes activating a profile selection function on the media recording device and receiving, via the profile selection function, an identifier of a target viewer of media content. The profile selection function provides a list of social network contacts, including the target viewer, via a display component of the media recording device. The method also includes retrieving contact preferences associated with the identifier from the memory. The contact preferences are determined from data about the target viewer that is sourced from at least one of a plurality of compartmentalized entities. The contact preferences identify focal aspects of media content statistically determined to be of interest by the target viewer. The method further includes providing suggested focal aspects of a scene subject to media capture, the suggested focal aspects derived from the contact preferences.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

The embodiments described herein provide visual focal point composition for media capture based on a target recipient audience. In particular, the embodiments include analyzing data associated with social network contacts of a user to determine their preferences and providing facilitated media capture of a scene based on the preferences. These and other features will now be described.

Figure 1:
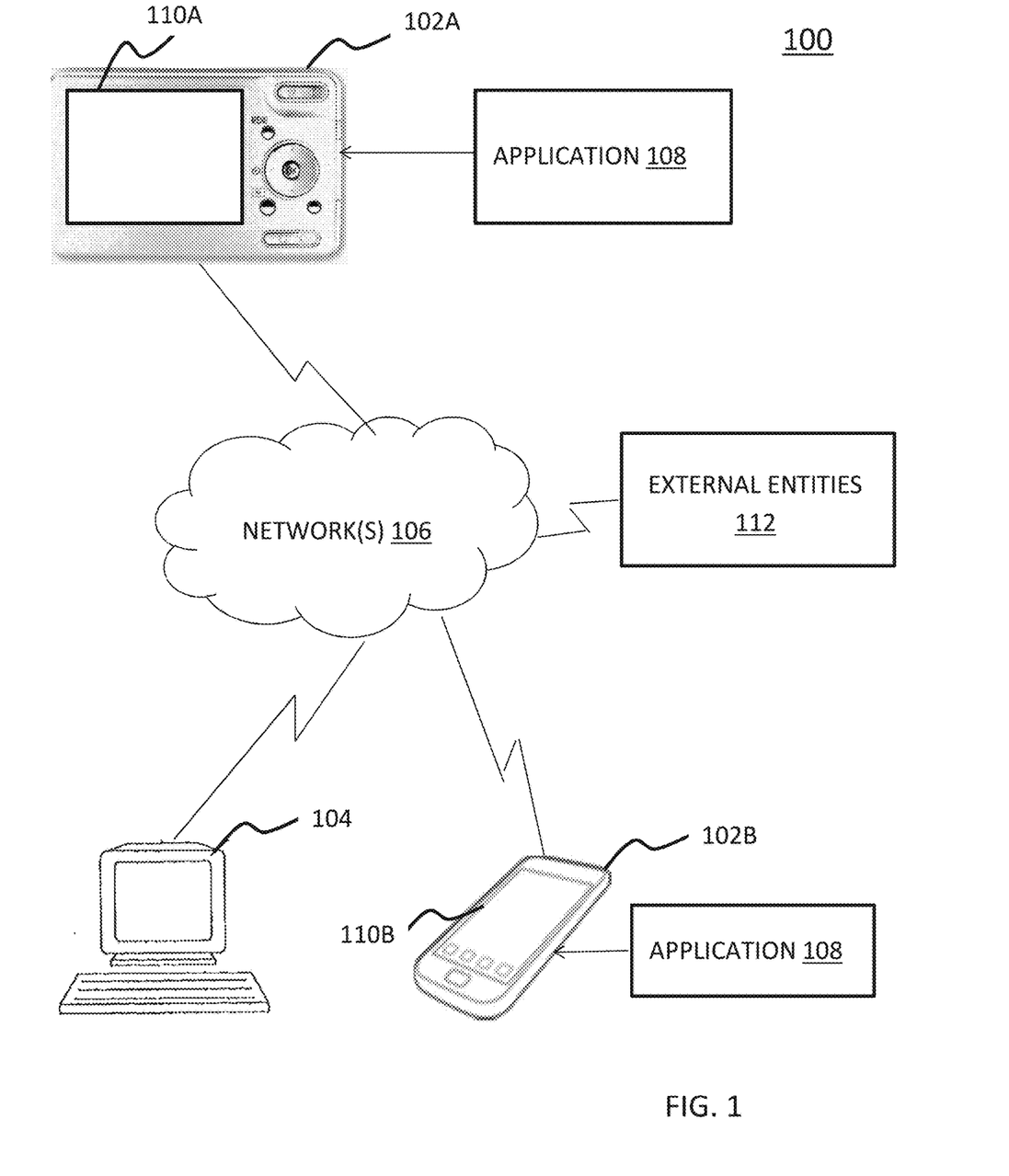
FIG. 1 depicts a system upon which assisted focal point composition of media capture processes may be implemented in accordance with some embodiments.

Turning now to FIG. 1, a system 100 upon which focal point composition for media capture may be implemented will now be described. The system 100 of FIG. 1 includes media recording devices 102A and 102B, a computer device 104, and external entities 112, each of which is communicatively coupled to one or more networks 106. As shown in FIG. 1, media recording device 102 is a camera and media recording device 102B is a smartphone. However, it will be understood that each of the media recording devices 102A-102B (collectively referred to as "102") may be implemented as any computer processing device with media recording capabilities (e.g., image capture and/or video capture), as well as capabilities to transfer recorded media to other devices and/or upload the recorded media to a network website. The media recording devices 102 include internal memory that stores data and instructions used in implementing the focal point composition for media capture processes. In an embodiment, the internal memory also stores contacts and contact preferences, as will be described further herein.

The users of the media recording devices 102 and the computer device 104 may be social network contacts with regard to one another. A social network contact may be described as an individual, group of individuals, or entity that has a relationship with another social network user, such that the contact is explicitly or implicitly provided with at least some access to the user's personal social network information and is able to communicate with the user via the social network. In an embodiment, the users of the media recording devices 102 and the computer device 104 may be social network contacts with regard to one another across multiple social networks.

Each of the media recording devices 102 executes an application 108 for implementing at least a portion of the exemplary focal point composition for media capture described herein. In an embodiment, the application 108 is configured to acquire information about the social network contacts and determine contact preferences associated with the social network contacts from the acquired information, as well as provide suggested focal aspects of a scene subject to capture by a user of the media recording device based on the contact preferences. In one embodiment, the information is acquired by the application 108 through an automated online search of the contacts' social network activities and behavior. In another embodiment, at least a portion of the information may be manually input via the application 108 by the user of the media recording device.

Figure 4:
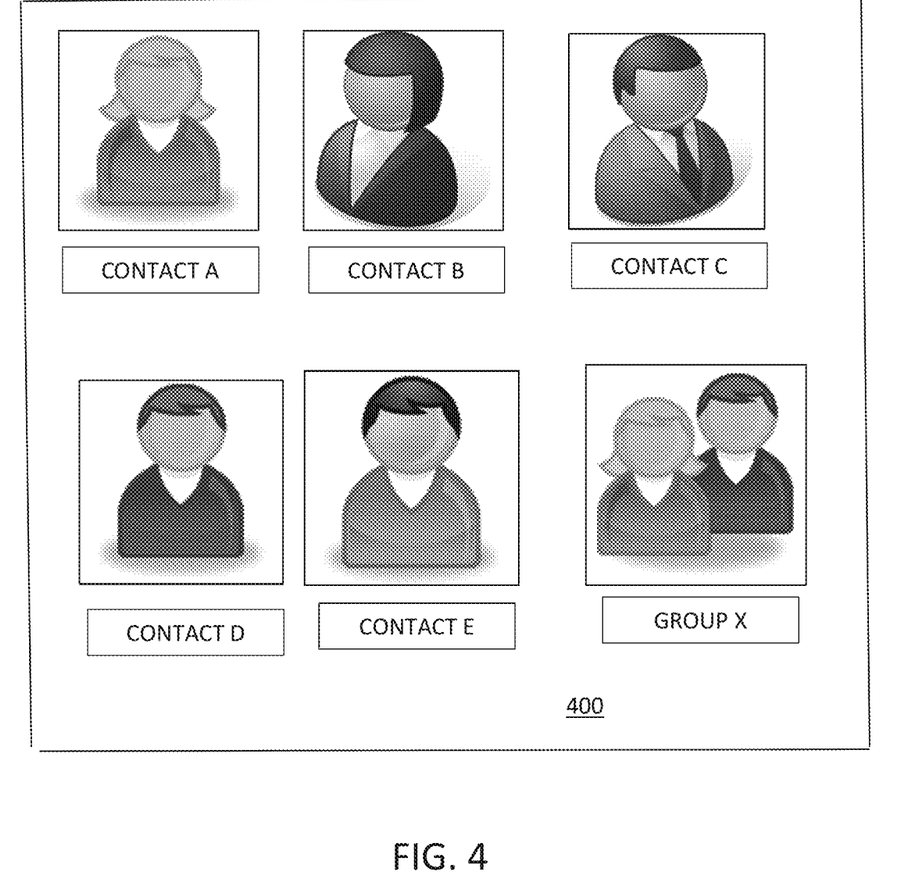
FIG. 4 depicts a user interface screen of a media recording device including a listing of contacts through a profile selection function in accordance with some embodiments.

The media recording devices include display screens 110A and 110B, respectively. In an embodiment, the display screens 110A-110B (collectively referred to as "110") display user preferences for a user's social network contacts, as well as suggested focal aspects relating to a scene subject to media capture based on a target viewer. A user interface screen illustrating sample user preferences and suggested focal aspects is shown in FIG. 4. In addition, the media recording devices 102 include recording components, such as a shutter button, lens, etc., and other elements configured to capture media.

While two media recording devices 102 are shown in FIG. 1, for purposes of illustration, it will be understood that any number and type of media recording devices may be utilized in order to realize the advantages of the embodiments described herein.

Computer device 104 may be a general-purpose computer (e.g., desktop or laptop) or may be a tablet PC, smartphone, or other similar type of computer device. In an embodiment, the computer device 104 may be operated by a social network contact (e.g., network "friend") of the user of one or more of the devices 102. The application 108 executing on the media recording device 102 accesses various information associated with the contact to derive the contact preferences, as will be described further herein.

Networks 106 may be any type of known networks including, but not limited to, a wide area network (WAN), a local area network (LAN), a global network (e.g. Internet), a virtual private network (VPN), and an intranet. The network(s) 106 may be implemented using a wireless network or any kind of physical network implementation known in the art, e.g., using cellular, satellite, and/or terrestrial network technologies.

External entities 112 (also referred to as "compartmentalized entities") represent compartmentalized sources of information that are used by the application 108 to gather information relating to social network contacts. The entities 112 are compartmentalized in that they may be separate, independent sources of information operated as independent web servers for various social network websites, as well as other publicly available information. For example, the entities 112 may include at least one social network website and web server.

Figure 2:
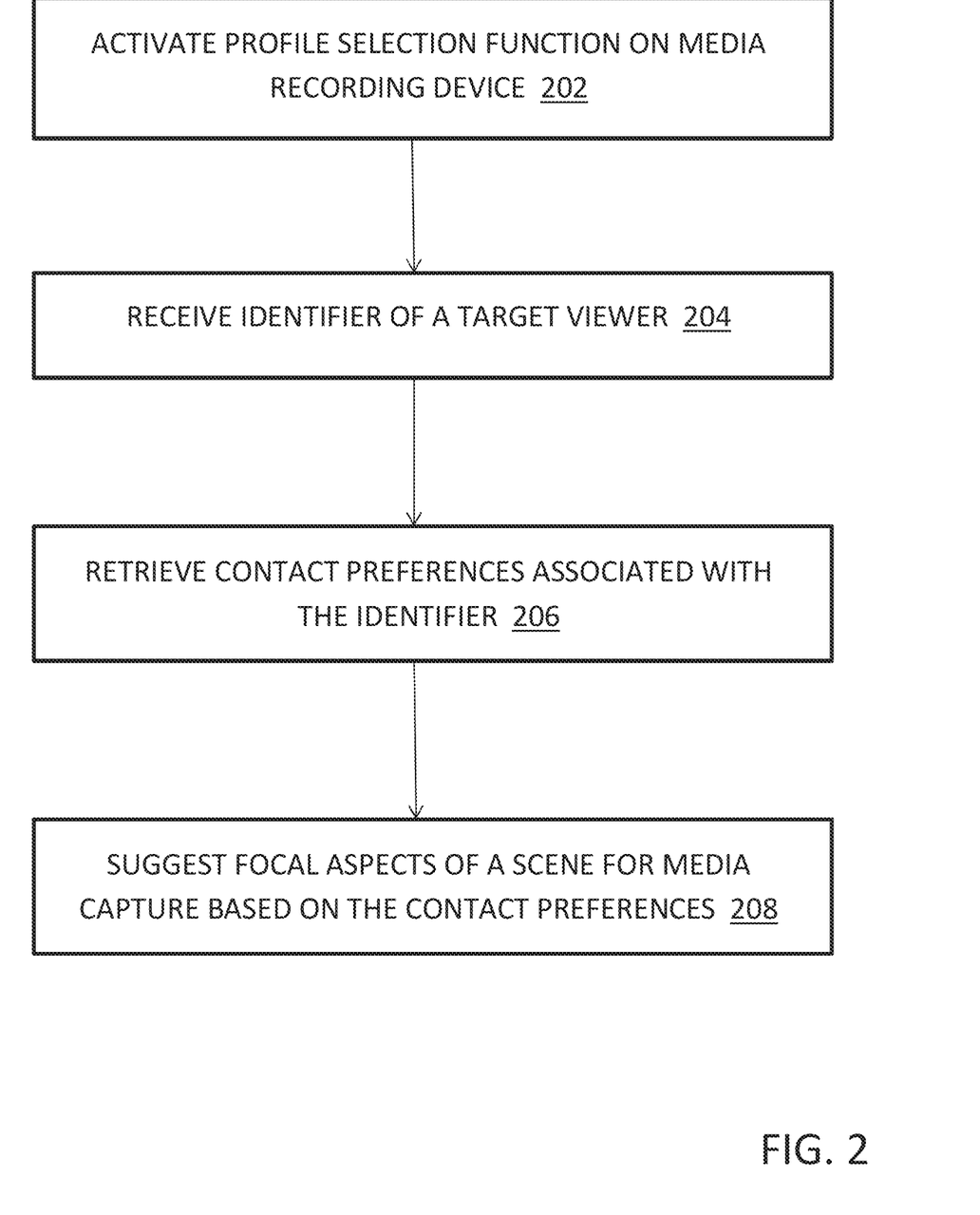
FIG. 2 depicts a flow diagram of a process for implementing focal point composition of media capture in accordance with some embodiments.

Turning now to FIG. 2, a flow diagram of a process in accordance with an embodiment is generally shown. The process of FIG. 2 assumes that contact preferences for social network contacts of a user have been created and stored by the application 108, and the user of a media recording device (e.g., device 102A) is preparing to record a scene (e.g., image or video). At block 202, the user of the media recording device activates a profile selection function on the device 102. The profile selection function may be activated, e.g., through an icon or menu option provided by the application 108 and displayed on the display screen 110. Alternatively, the profile selection function may be triggered through a physical button or knob on the device 102.

The profile selection function, once activated, causes the application 108 to provide a list of social network contacts of the user, e.g., via the display screen 110 on the device 102. The social network contacts listing may be acquired by the application 108 from the user's social network account. A list of social network contacts is shown in a user interface screen 400 of FIG. 4.

The user determines a target viewer (i.e., at least one of the social network contacts) for viewing a media item (e.g., image or video) once it is recorded. In other words, the user is preparing to capture an image or video of the scene and determines who his/her intended target viewer(s) of the resulting media item will be. While the media item may be posted on the user's social network site for all contacts to see, it may be that the user is particularly interested in ensuring that the media item makes an impact or impression on a specific contact or number of contacts. Thus, the user, by selecting a target viewer, intends to capture focal aspects of a scene that are most likely to be in line with the target viewer's personal preferences (i.e. contact preferences).

The list of social network contacts provided by the profile selection function includes unique identifiers or tags that are attributed to each of the contacts, such that when the user selects the target viewer (e.g., through touchscreen technology on the display device 110 or via a physical control of the device 102), the application 108 identifies the target viewer. Thus, at block 204, the application 108 receives the identifier of the target viewer for the media item, e.g., from a selection made via the user interface screen 400 of FIG. 4.

At block 206, contact preferences associated with the identifier are retrieved from the internal memory of the device 102. The contact preferences are determined from data about the target viewer that is sourced from one or more compartmentalized entities. The compartmentalized entities may include, e.g., multiple social networks in which the target viewer is a member or any publicly available and searchable source. The contact preferences identify focal aspects of media content statistically determined to be of interest to the target viewer. The contact preferences determination is described further in FIG. 3.

Figure 5:
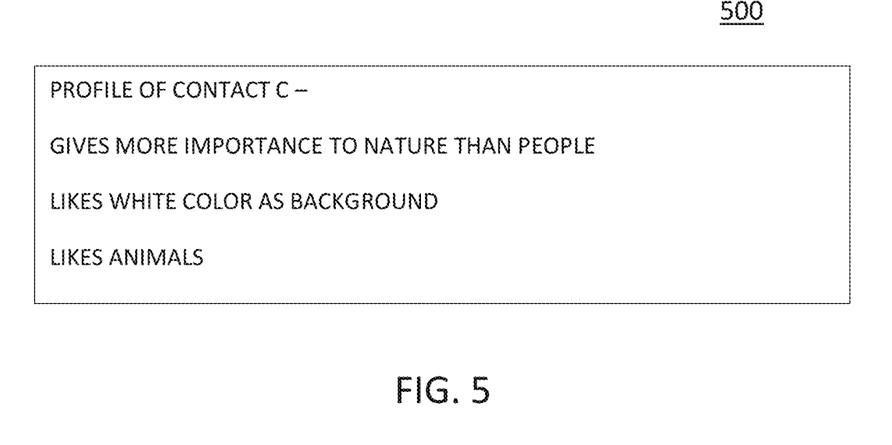
FIG. 5 depicts a user interface screen of a media recording device including contact preferences in accordance with some embodiments.

At block 208, the media capture device provides suggested focal aspects of the scene subject to media capture based on the contact preferences. The suggested focal aspects may be provided in response to a trigger event, such as the user activating a media capture function on the media capture device. The media capture function, e.g., may be activated by a partial depression of a shutter button on the device 102. The contact preferences are presented to the user of the media recording device 102. As shown in FIG. 5, a user interface screen 500 illustrates sample contact preferences for a selected target viewer.

In an embodiment, once the contact preferences are determined, the application 108 may be configured to adjust settings on the media recording device to accommodate the suggested focal aspects, record the scene, and transmit the recorded scene to a social network website for access by the target viewer. At least a portion of the settings may be adjusted, e.g., through user input on the device 102 (such as by manually changing device settings) and/or may be adjusted automatically by the device 102 without user input. For example, if one of the preferences relates to lighting, the media recording device 102 may automatically adjust the shutter speed on the device. The recorded scene (i.e., media item) may be transmitted wirelessly (e.g., through a wireless adapter of the device 102), or may be transmitted via a transfer function to another device (e.g., through a USB cable).

Figure 3:
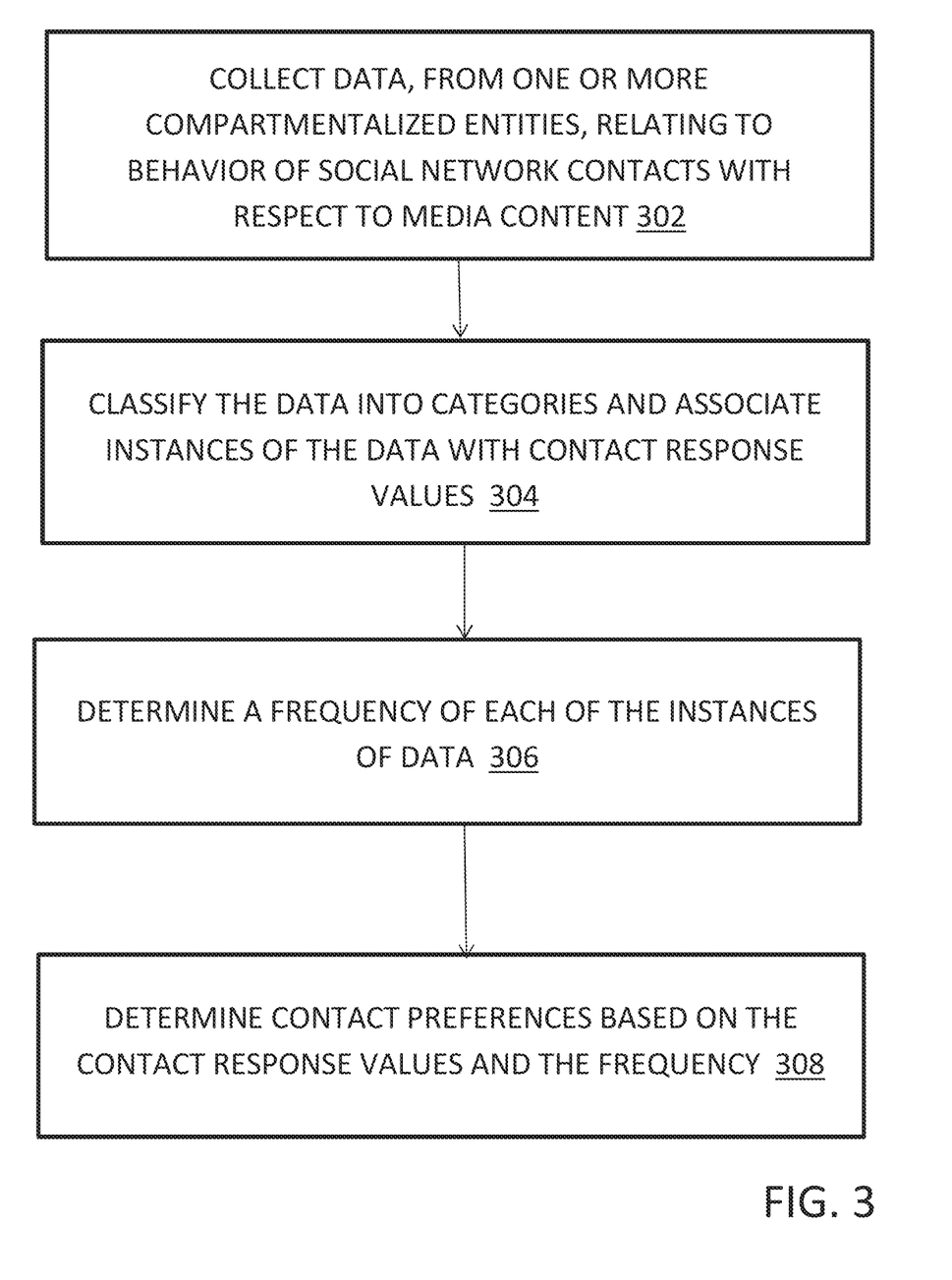
FIG. 3 depicts a flow diagram of a process for implementing focal point composition of media capture in accordance with some embodiments.

Turning now to FIG. 3, the determination of contact preferences for the social network contacts will now be described. At block 302, the application 108 collects data from one or more compartmentalized entities 112, e.g., publicly available information on the Internet, social networks in which the target viewer is a member, etc. The data relates to behavior activities of the social network contacts. Behavioral activities include responsive comments to other network users' posted content or other indicator (e.g., a "like" or "share" function), the social network contacts' own posted content, and any other information that qualifies or renders an opinion of content.

At block 304, the application 108 classifies the data into categories of subject matter and associates instances of the data with contact response values. Categories may be any defined organizational structure of data. For example, a category of animals may include instances of data relating to pets, zoo animals, wildlife, etc. The contact response values may include an indicator of preference or lack of preference. For example, a response value may be considered "positive" if the response is a "like" indication associated with a posted image, whereas, a response value may be considered negative if no response to an image is posted by the user or a negative response is posted.

At block 306, the application 108 determines a frequency of the instances of the data. For example, the application 108 tracks a number of comments posted by a contact that are attributable to media items in which an animal is depicted.

At block 308, the application 108 determines the contact preferences of the social network contacts as a function of the contact response values and the frequency. For example, a contact posts positive comments (or other positive indicator) on about 78 percent of the media items on a social network website in which nature is depicted. The contact also posts positive comments (or other positive indicator) on only 5 percent of the media items in which a person is depicted. The contact may further post no comments (positive or negative) on media items in which objects (non-living) are depicted. The application 108 calculates the responses based on the nature of the response (positive versus negative), as well as the frequency of response with respect to the media items.

In an embodiment, the processes described in FIG. 3 may be periodically repeated and the contact preferences updated to reflect any changes in the personal tastes of the contacts over time.

The data collected for media content, such as images and video, may be processed to identify the category to which the content is assigned. For example, the application 108 may gather and parse text-based comments posted from members of the network site with respect to a media item, as well as tags associated with the media item.

The focal aspects subject to media capture are derived from the results of the data collection and processing described above. Focal aspects may relate to the object of the media capture, such as places, people, animals, nature, architecture, language and text (e.g., captions on an image, brand names or logos in an image, etc.). Focal aspects may also include characteristics of media capture, such as color, contrast, foreground, background, and post media capture effects (e.g., artistic elements added by a user).

In an embodiment, the target viewer may be a group of individuals (e.g., co-workers) of the user of the device 102. If a group of users is selected via the profile selection function (shown in FIG. 4), the application 108 retrieves collective contact preferences that correspond to the entire group. The contact preferences for a group may be generated in a similar fashion as that described above for a single target viewer, except that the response values and the frequency of instances of the data may be averaged by the application 108. For example, where a group consists of two contacts, suppose one contact prefers images of animals 80 percent of the time, and people 20 percent of the time. Suppose that the second contact prefers images of animals 50 percent of the time, and people 50 percent of the time. Averaging the corresponding values, the collective contact preferences would be a preference for animals 65 percent of the time and people 35 percent of the time.

Technical effects and benefits include providing visual focal point composition for media capture based on a target recipient audience. Data associated with social network contacts of a user is analyzed to determine their preferences with regard to media content, and suggested focal aspects determined from the preferences are provided to the user's media recording device.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for media capture comprising:
a media recording device; and
a processor configured for:
activating a selection function on the media recording device;
receiving, via the selection function on a display component of the media recording device from a user, an identifier of a target viewer of media content, wherein the target viewer is a person with whom the user intends to share media captured by the media recording device;
retrieving preferences associated with the identifier from a computer-readable memory, the preferences identifying focal aspects of media content statistically determined to be of interest by the target viewer; and
providing suggested focal aspects of a scene subject to media capture, the suggested focal aspects include a post media capture artistic effect derived from the preferences of the target viewer,
wherein the focal aspects of the scene are provided, via the display component of the media recording device, by a partial depression of a shutter button on the media recording device.

2. The system of claim 1, wherein the processor is further configured for determining the preferences for each of a plurality of social network contacts, the determining comprising:
collecting the data from the at least one of a plurality of compartmentalized entities, the data relating to behavioral activities of each of the plurality of social network contacts;
classifying the data into categories and associating instances of the data with contact response values;
determining a frequency of the instances of the data; and
determining the preferences of each of the plurality of social network contacts as a function of the response values and the frequency.

3. The system of claim 1, wherein the collecting the data from the at least one of a plurality of compartmentalized entities includes:
searching for text-based comments posted by the target viewer and tags associated with media content for which the target viewer generated a response.

4. The system of claim 1, wherein the target viewer is a group of individuals representing a subset of a plurality of social network contacts and the preferences associated with the identifier identify collective focal aspects of media content statistically determined to be of interest by the group of individuals.

5. The system of claim 1, wherein the focal aspects further include at least one of:
objects of the media capture, comprising at least one of:
places;
people;
animals
nature;
architecture;
language and text.

6. The system of claim 1, wherein the processor is further configured for:
adjusting settings on the media recording device to accommodate the suggested focal aspects;
recording the scene via the media capture device; and
transmitting recorded media to a social network for access by the target viewer.

* * * * *